(12) United States Patent
Yamanaka et al.

(10) Patent No.: US 6,871,986 B2
(45) Date of Patent: Mar. 29, 2005

(54) INTERIOR ILLUMINATING APPARATUS FOR VEHICLE

(75) Inventors: Osamu Yamanaka, Nishikasugai-gun (JP); Hiroshi Sugihara, Nishikasugai-gun (JP); Minoru Shibata, Nishikasugai-gun (JP); Shuichi Koyama, Nagoya (JP); Masahiro Ono, Okazaki (JP)

(73) Assignee: Toyoda Gosei Co., Ltd., Aichi (JP)

( * ) Notice: Subject to any disclaimer, the term of this patent is extended or adjusted under 35 U.S.C. 154(b) by 266 days.

(21) Appl. No.: 10/095,115

(22) Filed: Mar. 12, 2002

(65) Prior Publication Data

US 2002/0145879 A1 Oct. 10, 2002

(30) Foreign Application Priority Data

Mar. 12, 2001 (JP) ........................................ 2001-068048

(51) Int. Cl.⁷ ................................................ B06Q 1/26
(52) U.S. Cl. ........................... 362/490; 362/494; 362/84
(58) Field of Search ................................ 362/135, 488, 362/489, 490, 494, 84, 510

(56) References Cited

U.S. PATENT DOCUMENTS

| | | | | |
|---|---|---|---|---|
| 4,841,155 A | * | 6/1989 | Ushida et al. | 250/463.1 |
| 4,991,537 A | * | 2/1991 | Muramatsu | 116/286 |
| 5,040,480 A | * | 8/1991 | Iwazaki et al. | 116/286 |
| 5,130,548 A | * | 7/1992 | Sano et al. | 250/461.1 |
| 5,295,049 A | * | 3/1994 | Terada | 362/27 |
| 5,671,996 A | * | 9/1997 | Bos et al. | 362/488 |
| 5,920,150 A | * | 7/1999 | Crary et al. | 313/484 |
| 5,938,321 A | * | 8/1999 | Bos et al. | 362/494 |
| 5,997,161 A | * | 12/1999 | Stringfellow et al. | 362/489 |
| 6,131,172 A | * | 10/2000 | Sowards | 714/718 |
| 6,412,973 B1 | * | 7/2002 | Bos et al. | 362/494 |

FOREIGN PATENT DOCUMENTS

JP 2000-159011 6/2000

* cited by examiner

*Primary Examiner*—Thomas M. Sember
(74) *Attorney, Agent, or Firm*—McGinn & Gibb, PLLC

(57) ABSTRACT

An interior illuminating apparatus for a vehicle includes an interior rear-view minor which is connected and fixed to an interior ceiling of the vehicle for observing the rear. An LED is provided in a vicinity of the interior rear-view mirror at a forward position in a traveling direction of the vehicle and radiates ultraviolet light on a center part of an instrument panel. An operating unit adapted to receive the ultraviolet light from the LED is provided in the center part of the instrument panel. The apparatus includes a starting switch for actuating the LED on and off. The operating unit has fluorescent layers coated thereon and containing a substance which emits fluorescence when irradiated with the ultraviolet light from the LED.

23 Claims, 2 Drawing Sheets

INTERIOR ILLUMINATING APPARATUS FOR VEHICLE

CROSS REFERENCE TO RELATED APPLICATION

The present application is based on Japanese Patent Application No. 2001-68048, the entire contents of which are incorporated herein by reference.

BACKGROUND OF THE INVENTION

1. Field of the Invention

The present invention relates to an interior illuminating device for a vehicle, in which operating appliances emit fluorescence by receiving a light from a light source.

2. Related art

Generally, an interior illuminating apparatus for a vehicle of a permeable type has been employed in order to illuminate operating appliances provided on a central console. Specifically, there are arranged in the central console, various operating appliances such as switches, levers, etc. for operating an air conditioner and so on, and a light source is provided behind the operating appliances, so that the operating appliances can be visually confirmed when a light emitted from the light source penetrates front faces of the operating appliances.

However, troublesome works such as complicated wiring work have been required, because a number of electric wires for illuminating devices including light sources have been arranged behind the central console, and connectors have been connected to lead wires of the illuminating appliances.

On the other hand, according to an interior illuminating apparatus for a vehicle disclosed in Japanese Publication No. JP-A-2000-159011 of unexamined patent application, when a receiver detects that a light from a photoelectric transmitter is shielded by a hand of the occupants or so near operating appliances of the vehicle, a light is turned to the operating appliances from a light source which is integrated into an interior lamp, thus simplifying the wiring behind the central console.

However, the art disclosed in the above described publication has had a problem that although visibility will not be enhanced unless the light from the light source accurately irradiates the operating appliances, it would be likely that the operating appliances cannot be effectively irradiated with the light from the light source due to an obstacle such as a driver, auxiliaries inside the vehicle, for example, an interior rear-view mirror for confirming the rear, only because the light source is integrated into the interior lamp. In addition, in case where the light source is integrated into the interior lamp, the light source can be directly observed by the occupants, which is not favorable from a viewpoint of vehicle interior design. Further, there has been such a fear the light for illuminating the central console from a position of the interior lamp is radiated to the exterior of the vehicle through a windshield depending on an irradiation angle of the light, which may give bad influence to a driver on an oncoming vehicle in an opposite lane.

SUMMARY OF THE INVENTION

The present invention has been made to solve the above described problems, and an object of the invention is to provide an interior illuminating apparatus for a vehicle which has a simple structure and will not damage an aesthetic appearance of the interior, and at the same time, can accurately irradiate an operating unit.

The present invention has been made in order to attain the above described object, and has the following structure;

Specifically, there is provided an interior illuminating apparatus for a vehicle characterized by comprising an interior rear-view mirror which is connected and fixed to an interior ceiling of the vehicle for observing the rear, a light emitting device which is provided in vicinity of the interior rear-view mirror on a front side with respect to the interior rear-view mirror in a traveling direction of the vehicle and radiates ultraviolet light onto a center part of an instrument panel, an operating unit adapted to receive the ultraviolet light and provided in the center part of the instrument panel, and a switch device for actuating the light emitting device on and off, the operating unit having fluorescent layers coated thereon and containing substance which emits fluorescence when irradiated with the ultraviolet light from the light emitting device.

According to such a structure, the fluorescent layers of the operating unit emit light when they are irradiated with the ultraviolet light from the light emitting device. On this occasion, because the light emitting device is provided in vicinity of the interior rear-view mirror and on a front side in the traveling direction of the vehicle with respect to the interior rear-view mirror, the light from the light emitting device will not be shielded by an obstacle such as the interior rear-view mirror, but can accurately irradiate the operating unit enabling it to emit light. Moreover, the light emitting device arranged in such a position will not be directly observed by occupants, and aesthetic appearance of the interior of the vehicle will not be damaged. Further, because the center part of the instrument panel is irradiated from the vicinity of the interior rear-view mirror, the irradiating angle of the light is nearly vertical as compared with a case where irradiated from a position of an interior lamp. Accordingly, there will be less fear that the light may be radiated to the exterior through the windshield. In addition, because a surface of the operating unit is irradiated from outside, there will be no need of arranging the light sources and wiring behind the operating unit (inside the center part of the instrument panel or so). Accordingly, the center part of the instrument panel will be simply constructed, and can be easily mounted on the vehicle body.

In the above described interior illuminating apparatus, the light emitting device preferably includes a light emitting diode and emits the ultraviolet light having a light emitting wave length in a range of 380 to 400 nm. By employing the light emitting diode as the light emitting device, low consumption of electricity can be attained, and an amount of the electricity to be consumed will be low even though it remains illuminated in the nighttime. Moreover, with the light emitting wave length in the above described range, the light from the light emitting device will not be visible to naked eyes. Therefore, the interior of the vehicle will not be illuminated unnecessarily, which is advantageous for safe driving in the nighttime. Further, since the inside of the vehicle cannot be easily observed from the outside, privacy can be protected.

Moreover, the fluorescent layers can be so constructed that they continue to emit fluorescence for a predetermined period after the ultraviolet light from the light emitting device has been shielded. With such a structure, the fluorescent layers excited by the light from the light emitting device stay emitting the light for the predetermined period after the light has been shielded. Accordingly, even though the light from the light emitting device is shielded by a hand of a driver or the like, the fluorescent layers will continue to emit light, and the operating unit can be easily observed, thus enhancing operability. Even though electric voltage having a constant cycle in which on and off are repeated is applied to the light emitting diode, the fluorescent layers can emit substantially constant light. As the results, saving of electricity can be further promoted.

The switch device may be associated with illumination of an auxiliary lamp, to eliminate a trouble of switching on.

DETAILED DESCRIPTION OF THE PREFERRED EMBODIMENT

Now, an embodiment of the present invention will be described referring to FIGS. 1 to 4.

Figure 1:
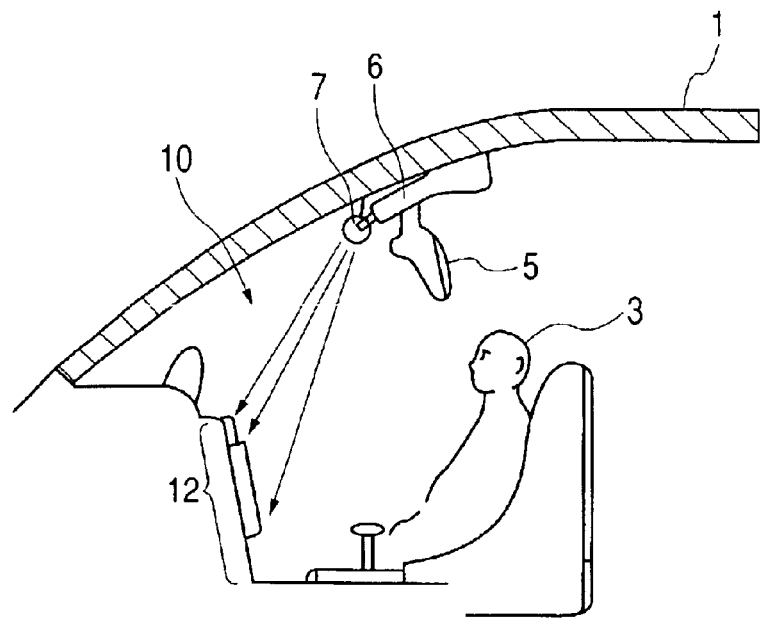
FIG. 1 is a side view, partly in section, of an interior illuminating apparatus for a vehicle showing an embodiment.
Figure 2:
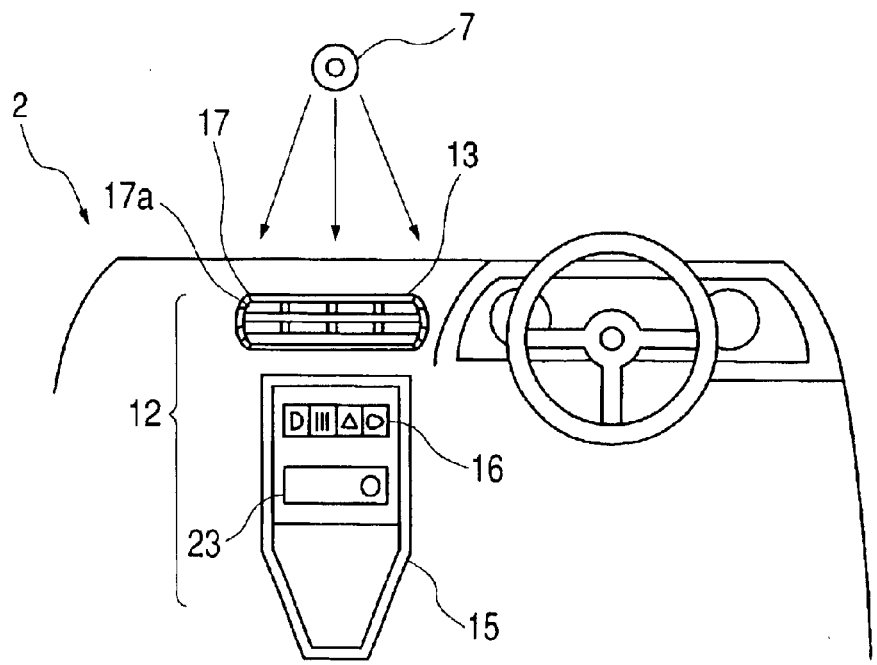
FIG. 2 is a front view of the interior illuminating apparatus for the vehicle as shown in FIG. 1.
Figure 3:
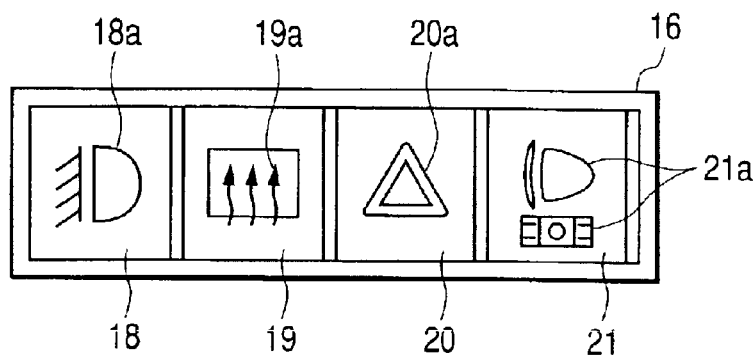
FIG. 3 is an enlarged front view of operating switches and so on in an operating section as shown in FIG. 2.
Figure 4:
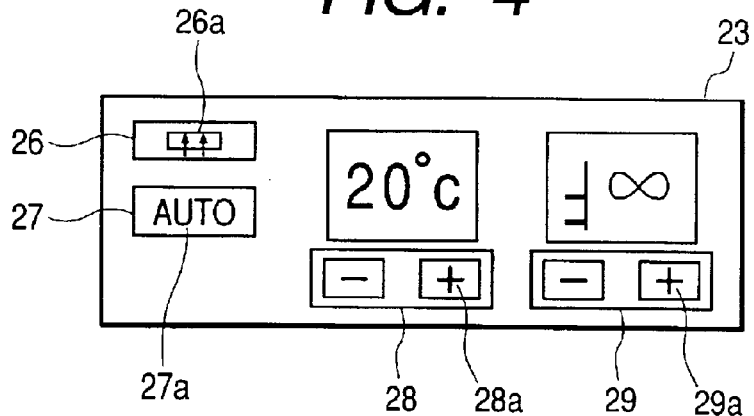
FIG. 4 is an enlarged front view of operating switches for an air conditioner in the operating section as shown in FIG. 2.
Figure 5:
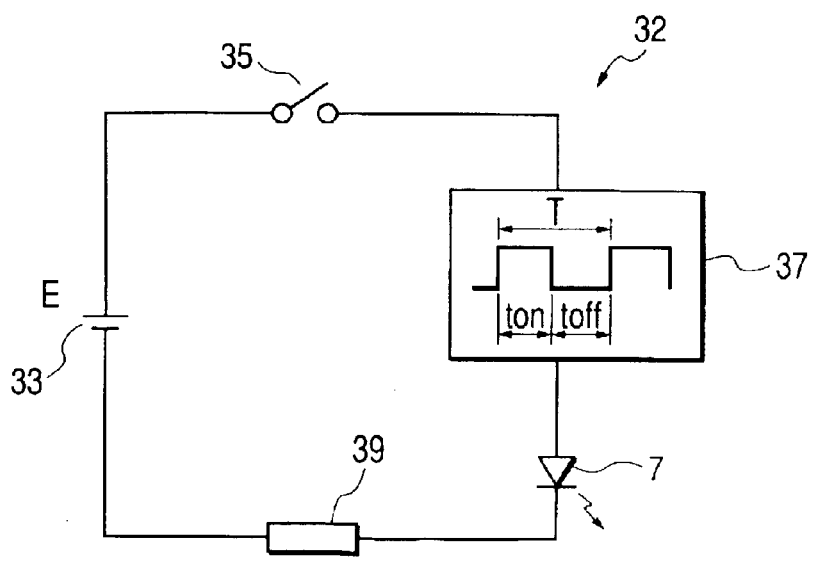
FIG. 5 shows an electrical circuit of the interior illuminating apparatus for the vehicle.

FIG. 1 is a side view, partly in section, of an interior illuminating apparatus 10 for a vehicle according to the embodiment, FIG. 2 is a front view of the interior illuminating apparatus 10 for the vehicle as shown in FIG. 1, FIG. 3 is an enlarged front view of operating switches in an operating unit 12 as shown in FIG. 2, FIG. 4 is an enlarged front view of a ventilating opening 13 in the operating unit 12 as shown in FIG. 2, and FIG. 5 shows an electrical circuit for the interior illuminating apparatus 10 for the vehicle.

In the interior illuminating apparatus 10 of this embodiment, a light source 7 is provided in vicinity of and on a front side in the traveling direction of the vehicle with respect to an interior rear-view mirror 5 with which a driver 3 observes a rear view. The light source 7 is fixed to an interior ceiling of the vehicle 1 in such a manner that a light emitted from the light source 7 may irradiate an entire area of the operating unit 12 installed in a center part 2 of an instrument panel. At the same time, the light source 7 is fixed at a position behind the interior rear-view mirror 5 with respect to the occupants, so that the light emitted from the light source 7 may not irradiate the occupants.

The light source 7 is hardly observed directly from the occupants. The light source 7 is fixed to a forward end of a fixation part 6 of the interior rear-view mirror 5, and also fixed to an inner face of the ceiling of the vehicle 1.

The light source 7 is mounted on a surface of a base plate, and as a light emitting element and illuminating apparatus, preferably, though not particularly limited, a light emitting diode (hereinafter referred to as an LED) generating ultraviolet ray which is preferably not visible to naked eyes, though not particularly limited, having a light emitting wavelength of 383 nm, is employed. Constitution of the LED 7 is not particularly limited, as long as the above mentioned light emitting wavelength can be obtained, but the LED having a light emitting layer formed of a group III nitride compound semiconductor may be employed.

The LED 7 is fixed to the forward end of the fixation part 6 of the interior rear-view mirror 5 so as not to move, even when the driver 3 has changed by hand a rear observing angle of the interior rear-view mirror 5. This is because when a mirror part of the interior rear-view mirror 5 is moved vertically or laterally, the LED 7 also moves to change a direction of emitting the light from the LED 7, and the operating unit 12 will be unable to be irradiated.

Since the LED 7 is small, the base plate on which the LED 7 is mounted is also small. In order to attain a more compact structure, an LED of a chip type may preferably be employed. Number of the LED 7 is not particularly limited, but one, or plurality of LEDs are mounted on the base plate.

In any case, such a number of the LEDs 7 that fluorescence layers of the operating unit 12 which will be described below can be irradiated with sufficient amount of light may preferably be employed.

Components in the operating unit 12 are not particularly limited, as long as the driver can operate them, but, as shown in FIGS. 2 to 4, there are illustrated as examples, an angle adjusting dial 17 for varying an angle of the ventilating opening 13, an operating switch section 16 having a plurality of operating switches, and an air conditioner operating unit 23. In the operating switch section 16, there are provided a fog lamp switch 18, a wire heating switch 19 for heating a rear window, a hazard flasher switch 20, and an adjusting dial 21 for adjusting a height of head lamps.

In the air conditioner operating unit 23, are provided a defrosting switch 26, an air conditioner switch 27 for switching on and off the air conditioner, a temperature setting switch 28, and an air flow switch 29 for regulating an amount of air flow.

Moreover, on the dials 17, 21 and symbol marks of the switches 18 to 20, 26 to 29, are respectively provided fluorescent layers 17a to 21a, 26a to 29a which emit light favorably by receiving and being excited with the light from the LED 7.

The adjusting dial 21 is provided with the fluorescent layer 21a on its symbol mark too.

The fluorescent layers 17a to 21a, 26a to 29a are not particularly limited, as long as the above described conditions are satisfied. The fluorescent substance to be contained in the fluorescent layers may include, for example, $Zn_2SiO_4$; $Y_2SiO_5:Ce^{3+}$, $Tb^{3+}$; $Sr_2Si_3O_8 0.2SrCl_2:Eu$; $BaMg_2Al_{16}O_{27}:Eu^{2+}$, $Mn^{2+}$; $ZnSiO_4:Mn$; $Zn_2SiO_4:Mn$; $LaPO_4:Tb$; $SrAl_2O_4:Eu$ etc.; which emit green colored light, $6MgO \cdot As_2O_5:Mn^{4+}$; $Y(PV)O_4:Eu$; $CaLa_{0.1}Eu_{0.9}Ga_3O_7$; $BaY_{0.9}Sm_{0.1}Ga_3O_7$; $Ca(Y_{0.5}Eu_{0.5})$ $(Ga_{0.5}In_{0.5})_3O_7$; $Y_3O_3:Eu$; $YVO_4:Eu$; $Y_2O_2:Eu$; $3.5MgO 0.5MgF_2GeO_2:Mn^{4+}$; and $(Y \cdot Cd) BO_2:Eu$; etc. which emit red colored light, and $(Ba,Ca,Mg)_5(PO_4)_3Cl:Eu^{2+}$; $(Ba,Mg)_2Al_{16}O_{27}:Eu^{2+}$; $Ba_3MgSi_2O_8:Eu^{2+}$; $BaMg_2Al_{16}O_{27}:Eu^{2+}$; $(Sr,Ca)_{10}(PO_4)_6Cl_2:Eu^{2+}$; etc. which emit blue colored light.

The fluorescent layers 17a to 21a, 26a to 29a can be formed for example, by painting or printing coating material containing the fluorescent substances, or applying a tape or film containing the fluorescent substances.

The fluorescent layers 17a to 21a, 26a to 29a may preferably emit fluorescent light for a predetermined period after the light from the LED 7 has been shielded, in short, may preferably have light persistence property. This is because even though the light from the LED 7 has been shielded by a hand, the fluorescent layers 17a to 21a, 26a to 29a continue to emit fluorescence and visibility of the operating unit 12 will be further secured. To obtain the fluorescent layers having such property, fluorescent substances having light persistence property such as Zn:S; $SrAl_2O_4$:Eu; $SrAl_2O_4$:Eu,Dy; $SrAl_2O_4$:Eu,Nd; $CaAl_2O_4$:Eu,Sm; $CaAl_2O_4$:Eu,Nd; $BaAl_2O_4$:Eu,Nd; $BaAl_2O_4$:Eu,Sm; $Sr_xCa_{1-x}Al_2O_4$:Eu,Dy may be employed.

The electrical circuit 32 of the interior illuminating apparatus 10 for the vehicle includes, as a power source, a battery 33 of 12V for vehicles, as shown in FIG. 5, and is formed in such a manner that by switching on a starting switch 35 as switching means for turning the battery on and off in association with an action of an auxiliary lamp, an electric current which is restricted by a resistor 39 may flow to the LED 7 by way of a square wave generating circuit 37.

In this connection, the starting switch 35 is not limited to a type which are switched on and off in association with the auxiliary lamp, but the starting switch 35 may be independently actuated on and off. The square wave generating circuit 37 is not required, unless the fluorescent layers 17a to 21a, 26a to 29a emit phosphorescence. This is because the LED 7 does not uniformly emit lights.

A ratio between an on time "ton" and an off time "toff" of the square wave generating circuit 37 is not particularly limited. In case where the phosphorescence is emitted long, the on time "ton" can be reduced, and the off time "toff" can be increased.

Operation of the interior illuminating apparatus 10 having the above described structure will be described referring to FIGS. 1 to 5.

When the auxiliary lamp is lit and the starting switch 35 is turned on, a square wave voltage is applied to the LED 7 from the square wave generating circuit 37 by the battery 33, and an electric current flows through the resistor 39 for energizing the LED 7 to emit light. The light from the LED 7 is radiated to the center part 2 of the instrument panel and irradiates the fluorescent layers 17a to 21a, 26a to 29a of the dials 17, 21 and the switches 18, 21, 26, 29. The fluorescent substance contained in the fluorescent layers 17a to 21a, 26a to 29a is excited to emit fluorescence from the fluorescent layers.

According to the interior illuminating apparatus for the vehicle in this embodiment, when clearance lamps are lit to switch on the starting switch 35, the LED 7 emits light to accurately irradiate the fluorescent layers 17a to 21a, 26a to 29a on the operating unit 12. Because the LED 7 is provided in vicinity of the interior rear-view mirror 5 and at a forward position in the traveling direction of the vehicle, the light from the LED will be never shielded by obstacles such as the interior rear-view mirror 5 or so on, and the operating unit 12 can be reliably irradiated. In this manner, visibility of the operating unit 12 will be improved.

Since the LED 7 emits the ultraviolet ray which is not a visible light, a driver of an oncoming vehicle will not be badly influenced in the nighttime, and since the inside of the vehicle will not be easily observed from the outside, privacy can be protected.

Since the LED 7 is provided behind the rear-view mirror 5, the LED is hardly observed directly by the occupants.

Further, an amount of electricity to be consumed will be low even though the LED remains illuminated in the nighttime, because the LED 7 having a low power consumption is employed.

In case where the fluorescent layers 17a to 21a, 26a to 29a contain the fluorescent substance having the light persistent property, the fluorescent layers 17a to 21a, 26a to 29a stay illuminating for a predetermined time after the light has been shielded, and thus, the operating unit 12 can be more easily observed enhancing the operability.

Even though an electric voltage having a constant cycle in which on and off are repeated by means of the square wave generating circuit 37 is applied to the LED 7, a substantially constant light can be generated from the fluorescent layers. As the results, saving of electricity can be further promoted.

In addition, because the LED 7 is associated with illumination of the auxiliary lamp, a trouble of switching the starting switch 35 can be eliminated.

The present invention is not limited to the description of the above described embodiment. This invention also includes various modifications which are not deviated from a scope of the claims for patent and can be achieved by those skilled in the art.

What is claimed is:

1. An interior illuminating apparatus for a vehicle, comprising:

an interior rear-view mirror fixed to an interior ceiling of said vehicle;

a light emitting device provided in a vicinity of said interior rear-view mirror and on a front side in a forward traveling direction of said vehicle with respect to said interior rear-view mirror and radiating ultraviolet light on a center part of an instrument panel;

an operating unit adapted to receive said ultraviolet light and provided in said center part of the instrument panel; and a switch device for actuating said light emitting device on and off;

a fluorescent layer provided on said operating unit and including a substance which emits fluorescence when irradiated with said ultraviolet light from said light emitting device.

2. The interior illuminating apparatus according to claim 1, wherein said light emitting device comprises a light emitting diode that emits ultraviolet light including a light emitting wave length in a range of 380 to 400 nm.

3. The interior illuminating apparatus according to claim 1, wherein said fluorescent layers continue to emit fluorescence for a predetermined period after said ultraviolet light from said light emitting device has been shielded.

4. The interior illuminating apparatus according to claim 1, wherein said switch device is interlockingly operated with illumination of an auxiliary lamp.

5. The interior illuminating apparatus according to claim 1, wherein said light emitting device comprises a light emitting diode.

6. The interior illuminating apparatus according to claim 5, wherein said light emitting diode comprises a light emitting layer including a group III nitride compound semiconductor.

7. The interior illuminating apparatus according to claim 1, wherein said light emitting device emits ultraviolet light.

8. The interior illuminating apparatus according to claim 1, wherein said light emitting device emits ultraviolet light including a light emitting wave length in a range of 380 to 400 nm.

9. The interior illuminating apparatus according to claim 1, wherein said rear-view mirror comprises a fixed portion and a moveable portion, said light emitting device being disposed on said fixed portion.

10. The interior illuminating apparatus according to claim 1, wherein said ultraviolet light, radiated from said light emitting device on said operating unit, comprises a substantially vertical radiating angle with respect to said vehicle.

11. The interior illuminating apparatus according to claim 1, wherein said light emitting device is disposed to radiate said ultraviolet light on said operating unit at a radiating angle extending in a direction that is not equal to a direction extending from said light emitting device and through a window of said vehicle.

12. An interior illuminating apparatus for a vehicle, comprising:
   a light emitting device operable to radiate ultraviolet light and positioned in front of a rear view mirror in a forward traveling direction of said vehicle with respect to said interior rear-view mirror and on an interior ceiling of said vehicle; and
   an operating unit disposed in said vehicle and comprising a fluorescent layer,
   wherein said light emitting device is positioned to radiate ultraviolet light on said operating unit.

13. The interior illuminating apparatus according to claim 12, wherein said fluorescent layer comprises a substance that emits fluorescence when irradiated with said ultraviolet light from said light emitting device.

14. The interior illuminating apparatus according to claim 12, wherein said operating unit is disposed in a center part of an instrument panel of said vehicle.

15. The interior illuminating apparatus according to claim 12, wherein said light emitting device is disposed on an interior rear-view mirror of said vehicle.

16. The interior illuminating apparatus according to claim 15, wherein said interior rear-view mirror is independently repositionable with respect to said light emitting device.

17. The interior illuminating apparatus according to claim 12, wherein said light emitting device is disposed on a front side of an interior rear-view mirror of said vehicle in a forward traveling direction of said vehicle with respect to said interior rear-view mirror.

18. The interior illuminating apparatus according to claim 12, wherein said light emitting device is disposed on a forward end of a fixation part of an interior rear-view mirror of said vehicle.

19. The interior illuminating apparatus according to claim 12, wherein said light emitting device is disposed on an inner face of a ceiling of said vehicle.

20. The interior illuminating apparatus according to claim 12, further comprising:
   a switch device for actuating said light emitting device on and off.

21. The interior illuminating apparatus according to claim 12, wherein said light emitting device comprises a plurality of light emitting diodes that emit ultraviolet light.

22. The interior illuminating apparatus according to claim 12, wherein said operating unit comprises a plurality of operating units.

23. An interior illuminating apparatus for a vehicle, comprising:
   means for emitting ultraviolet light disposed in front of a rear view mirror in a forward traveling direction of said vehicle with respect to said rear view mirror and in a vicinity of at least one of an interior ceiling of said vehicle and said rear view mirror; and
   an operating unit disposed in said vehicle and comprising a fluorescent layer, wherein said means for emitting ultraviolet light is positioned to radiate ultraviolet light on said operating unit.

* * * * *